United States Patent
Dunne et al.

(10) Patent No.: US 11,055,169 B2
(45) Date of Patent: *Jul. 6, 2021

(54) FORECASTING WORKLOAD TRANSACTION RESPONSE TIME

(71) Applicant: International Business Machines Corporation, Armonk, NY (US)

(72) Inventors: Jonathan Dunne, Dungarvan (IE); Jeffrey B. Sloyer, Wake, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 16/365,683

(22) Filed: Mar. 27, 2019

(65) Prior Publication Data

US 2019/0220345 A1    Jul. 18, 2019

Related U.S. Application Data

(63) Continuation of application No. 13/471,685, filed on May 15, 2012, now Pat. No. 10,296,409.

(51) Int. Cl.
*G06F 11/07* (2006.01)
*G06F 11/34* (2006.01)

(52) U.S. Cl.
CPC ...... *G06F 11/0793* (2013.01); *G06F 11/3414* (2013.01); *G06F 11/3419* (2013.01); *G06F 11/3452* (2013.01); *G06F 2201/81* (2013.01); *G06F 2201/865* (2013.01)

(58) Field of Classification Search
CPC ............ G06F 11/0793; G06F 11/3414; G06F 11/3419; G06F 11/3452; G06F 2201/81; G06F 2201/865
USPC ...................................................... 714/47.3
See application file for complete search history.

(56) References Cited

U.S. PATENT DOCUMENTS

| | | | |
|---|---|---|---|
| 6,597,777 | B1 | 7/2003 | Ho |
| 6,801,940 | B1 | 10/2004 | Moran |
| 7,721,061 | B1 | 5/2010 | Kelly |
| 7,886,046 | B1 | 2/2011 | Zeitoun |
| 7,908,119 | B2 | 3/2011 | Bondi |
| 7,925,471 | B2 | 4/2011 | Nakaike |
| 8,095,447 | B2 | 1/2012 | Stephens |
| 9,451,086 | B2 | 9/2016 | Nourbakhsh |
| 10,296,410 | B2 * | 5/2019 | Dunne ............... G06F 11/0793 |

(Continued)

OTHER PUBLICATIONS

"Simulation" [online] Wikipedia, the Free Encyclopedia, Mar. 26, 2019, retreived from the Internet: <https://en.wikipedia.org/wiki/Simulation>, 32 pg.

(Continued)

*Primary Examiner* — Yair Leibovich
(74) *Attorney, Agent, or Firm* — Cuenot, Forsythe & Kim, LLC

(57) ABSTRACT

Reliability testing can include determining a transaction time for each of a plurality of transactions to a system under test during the reliability test, wherein the plurality of transactions are of a same type. Forecasts of transaction times can be calculated for the transaction type. The forecasts can be compared with a threshold time using a processor. A remedial action can be implemented responsive to at least one of the forecasts exceeding the threshold time.

20 Claims, 3 Drawing Sheets

(56) References Cited

U.S. PATENT DOCUMENTS

| | | | |
|---|---|---|---|
| 2002/0120488 A1* | 8/2002 | Bril | G06F 9/4887 718/103 |
| 2003/0065986 A1 | 4/2003 | Fraenkel | |
| 2004/0122950 A1 | 6/2004 | Morgan | |
| 2004/0236757 A1 | 11/2004 | Caccavale | |
| 2005/0047556 A1 | 3/2005 | Somerville | |
| 2005/0240465 A1 | 10/2005 | Kiran | |
| 2006/0026179 A1 | 2/2006 | Brown | |
| 2007/0168915 A1 | 7/2007 | Fabbio | |
| 2008/0103847 A1 | 5/2008 | Sayal | |
| 2009/0287744 A1 | 11/2009 | Bernardini | |
| 2010/0217701 A1 | 8/2010 | Mesilaty | |
| 2011/0126219 A1 | 5/2011 | Singh | |
| 2012/0192016 A1 | 7/2012 | Gotesdyner | |
| 2013/0061201 A1 | 3/2013 | Dayal | |
| 2013/0311820 A1 | 11/2013 | Dunne | |
| 2013/0311835 A1 | 11/2013 | Dunne | |

OTHER PUBLICATIONS

"Definition of Remedial", [online] Meriam Webster Incorporated © 2019, retrieved from the Internet: <https://www.merriam-webster.com/dictionary/remedial>, 2 pg.

U.S. Appl. No. 13/471,685, Non-Final Office Action, dated Dec. 26, 2013, 8 pg.

U.S. Appl. No. 13/471,685, Final Office Action, dated Jul. 16, 2014, 10 pg.

U.S. Appl. No. 13/471,685, Examiner's Answer, dated Jun. 1, 2015, 12 pg.

U.S. Appl. No. 13/471,685, Decision on Appeal, Jan. 27, 2017, 8 pg.

U.S. Appl. No. 13/471,685, Decision on Request for Rehearing, May 1, 2017, 12 pg.

U.S. Appl. No. 13/471,685, Non-Final Office Action, dated Jul. 26, 2017, 6 pg.

U.S. Appl. No. 13/471,685, Non-Final Office Action, dated Dec. 14, 2017, 5 pg.

U.S. Appl. No. 13/471,685, Final Office Action, dated Jul. 12, 2018, 9 pg.

U.S. Appl. No. 13/471,685, Notice of Allowance, dated Jan. 9, 2019, 8 pg.

U.S. Appl. No. 13/893,650, Non-Final Office Action, dated Dec. 24, 2013, 8 pg.

U.S. Appl. No. 13/893,650, Final Office Action, dated Jul. 18, 2014, 10 pg.

U.S. Appl. No. 13/893,650, Examiner's Answer, dated Jun. 1, 2015, 12 pg.

U.S. Appl. No. 13/893,650, Decision on Appeal, Jan. 27, 2017, 7 pg.

U.S. Appl. No. 13/893,650, Decision on Request for Rehearing, May 1, 2017, 12 pg.

U.S. Appl. No. 13/893,650, Non-Final Office Action, dated Jul. 27, 2017, 6 pg.

U.S. Appl. No. 13/893,650, Non-Final Office Action, dated Dec. 14, 2017, 5 pg.

U.S. Appl. No. 13/893,650, Final Office Action, dated Jul. 12, 2018, 9 pg.

U.S. Appl. No. 13/893,650, Notice of Allowance, dated Jan. 8, 2019, 8 pg.

* cited by examiner

FORECASTING WORKLOAD TRANSACTION RESPONSE TIME

BACKGROUND

Enterprise level software systems that support large numbers of users undergo extensive testing prior to release. Such a software system can have approximately 10,000 or more concurrent users. As such, testing of the software system typically includes reliability testing in which the software system, referred to as the "system under test," is installed within a computing environment including one or more data processing systems. The system under test is executed while a performance test system places an operating load upon the system under test. The performance test system, for example, initiates a variety of transactions with the system under test to simulate the operating conditions under which the system under test will be expected to reliably perform once released to customers.

BRIEF SUMMARY

One or more embodiments disclosed within this specification relate to reliability testing of a software-based system referred to as a system under test.

An embodiment can include a method. The method can include determining a transaction time for each of a plurality of transactions to a system under test during a reliability test. The plurality of transactions can be of a same transaction type. Forecasts of transaction times for the transaction type can be calculated. The forecasts can be compared with a threshold time using a processor. A remedial action can be calculated responsive to at least one of the forecasts exceeding the threshold time.

Another embodiment can include a system. The system can include a processor configured to initiate executable operations. The executable operations can include determining a transaction time for each of a plurality of transactions to a system under test during a reliability test, wherein the plurality of transactions are of a same transaction type, and calculating forecasts of transaction times for the transaction type. The forecasts can be compared with a threshold time and a remedial action can be implemented responsive to at least one of the forecasts exceeding the threshold time.

Another embodiment can include a computer program product. The computer program product can include a computer readable storage medium having stored thereon program code that, when executed, configures a processor to perform executable operations. The executable operations can include determining a transaction time for each of a plurality of transactions to a system under test during a reliability test, wherein the plurality of transactions are of a same transaction type, and calculating forecasts of transaction times for the transaction type. The executable operations further can include comparing the forecasts with a threshold time and implementing a remedial action responsive to at least one of the forecasts exceeding the threshold time.

DETAILED DESCRIPTION

Figure 1:
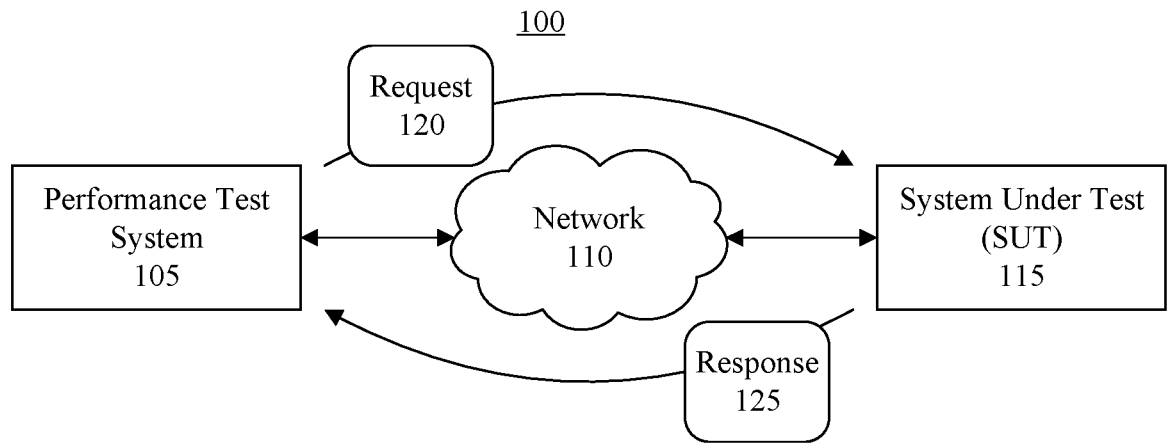
FIG. 1 is a block diagram illustrating an example of a test environment in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to reliability testing of software-based systems. In accordance with the inventive arrangements disclosed within this specification, the transaction time for one or more transactions can be determined during testing and used to calculate forecasts of transaction times in the future. The forecasts of transaction times can be compared with a threshold time. Responsive to one or more of the forecasts exceeding the threshold time, any of a variety of different remedial actions can be performed, e.g., by the performance test system conducting the reliability test of the system under test.

The transactions initiated by the performance test system with the system under test can be any of a variety of different transaction types. In one aspect, each different transaction type can be associated with a threshold time that is specific to the transaction type and, if desired, different from the threshold time of other transaction types. Further, transaction types can be assigned to one of a plurality of different criticality levels. In one aspect, the particular remedial action that is implemented can vary according to the criticality level of the particular transaction type for which a forecast of transaction time exceeds the threshold level.

FIG. 1 is a block diagram illustrating an example of a test environment 100 in accordance with an embodiment disclosed within this specification. As shown, test environment 100 can include a performance test system 105 and a system under test 115. Performance test system 105 can be communicatively linked with system under test 115 via a network 110. Network 110 can be implemented as any of a variety of different communication networks whether wired, wireless (e.g., mobile), a local area network, a wide area network, the Internet, or a combination thereof.

Performance test system 105 can be implemented as one or more data processing systems executing suitable reliability testing software that can place a transaction processing load on system under test 115. System under test 115 can be implemented as one or more data processing systems executing the particular software system that is undergoing reliability testing as conducted by performance test system 105.

Reliability testing, as conducted by performance test system 105, can initiate a transaction within system under test 115 and observe the response generated by system under test 115 upon completion of the transaction. Performance test system 105, for example, can initiate a transaction by sending a request 120 to system under test 115 via network 110 and determine that the transaction has completed operation upon receipt of response 125, e.g., a known and/or expected response depending upon the particular request sent to system under test 115. The transaction time for the transaction can be defined as the difference in time between response 125, e.g., the time response 125 is sent or received, and the time of request 120, e.g., the time request 120 is sent or received. In the example shown in FIG. 1, request 120 and response 125 can be sent via Hypertext Transfer Protocol (HTTP) through network 110, though any of a variety of networking protocols can be used.

Examples of transactions that can be tested in terms of determining transaction time by performance test system 105 can include, but are not limited to, retrieving content to be displayed, saving data (e.g., Wiki or blog content), a file upload, a file download, conducting a search of content, sending a message (e.g., an instant message), receiving a message, logging a user into the system under test, or the like. Each of the examples illustrated can be considered a different transaction type.

Although FIG. 1 illustrates the initiation and subsequent completion of a single transaction, it should be appreciated that performance test system 105 can be configured to initiate one or more transactions of various types as described above as part of a test plan conducted over a specified period of time. Typically, a reliability test is conducted over several hours or days and can last longer as performance test system 105 executes the test plan by initiating transactions with system under test 115. Over the time span of the reliability test, performance test system 105 can calculate and store the transaction times for transactions initiated during the reliability test.

Each transaction initiated with system under test 115 can be correlated with the particular components of system under test 115 that are involved, e.g., executed, in performing the transaction. Accordingly, performance test system 105 can determine when the transaction time of a transaction requires more time than expected to complete, one or more of the components of system under test 115 that are involved in performing the transaction likely include a problem or defect. Due to the length of time over which a reliability test takes place, however, determining deviations from normal or expected transaction times can be difficult. Still, determining that the transaction time of a given type of transaction is increasing over time can be an indication of a problem or defect in system under test 115 that may only manifest itself when system under test 115 is placed under load.

In general, performance test system 105 can be configured to calculate forecasts of transaction times into the future during the reliability test. The forecasts of transaction times can be compared with a threshold time. Responsive to a forecast of a transaction time exceeding the established threshold time, performance test system 105 can perform any of a variety of different remedial actions to be described herein in further detail.

Figure 2:
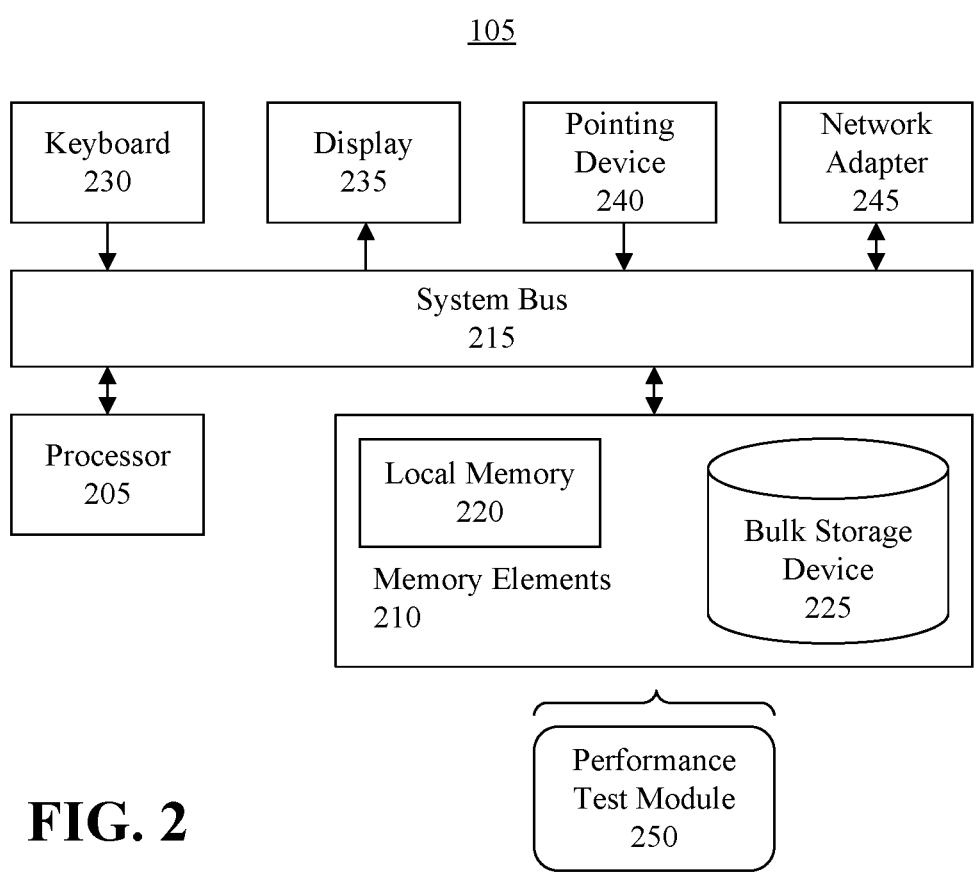
FIG. 2 is a block diagram illustrating an exemplary implementation of a performance test system as pictured in FIG. 1 in accordance with another embodiment disclosed within this specification.

FIG. 2 is a block diagram illustrating an exemplary implementation of performance test system 105 of FIG. 1 in accordance with another embodiment disclosed within this specification. Performance test system 105 can include at least one processor 205 coupled to memory elements 210 through a system bus 215 or other suitable circuitry. As such, performance test system 105 can store program code within memory elements 210. Processor 205 can execute the program code accessed from memory elements 210 via system bus 215. In one aspect, for example, performance test system 105 can be implemented as a computer, e.g., a data processing system, suitable for storing and/or executing program code. It should be appreciated, however, that performance test system 105 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. Performance test system 105 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to performance test system 105. The I/O devices can be coupled to performance test system 105 either directly or through intervening I/O controllers. One or more network adapters 245 also can be coupled to performance test system 105 to enable performance test system 105 to become coupled to other systems, computer systems, remote printers, and/or remote storage devices through intervening private or public networks. Modems, cable modems, and Ethernet cards are examples of different types of network adapters 245 that can be used with performance test system 105.

Performance test system 105 can store an operating system (not shown) and one or more applications such as performance test module 250 within memory elements 210. Performance test module 250, being implemented in the form of executable program code, can be executed by performance test system 105 and, as such, can be considered part of performance test system 105. Accordingly, performance test system 105 can be configured to output forecasts of transaction times during a reliability test and implement one or more remedial actions according to a comparison of the forecasts with an established threshold time. As used herein, "outputting" and/or "output" can mean storing in memory elements 210, for example, writing to a file stored in memory elements 210, writing to display 235 or other peripheral output device, playing audible notifications, sending or transmitting to another system, exporting, or the like.

Figure 3:
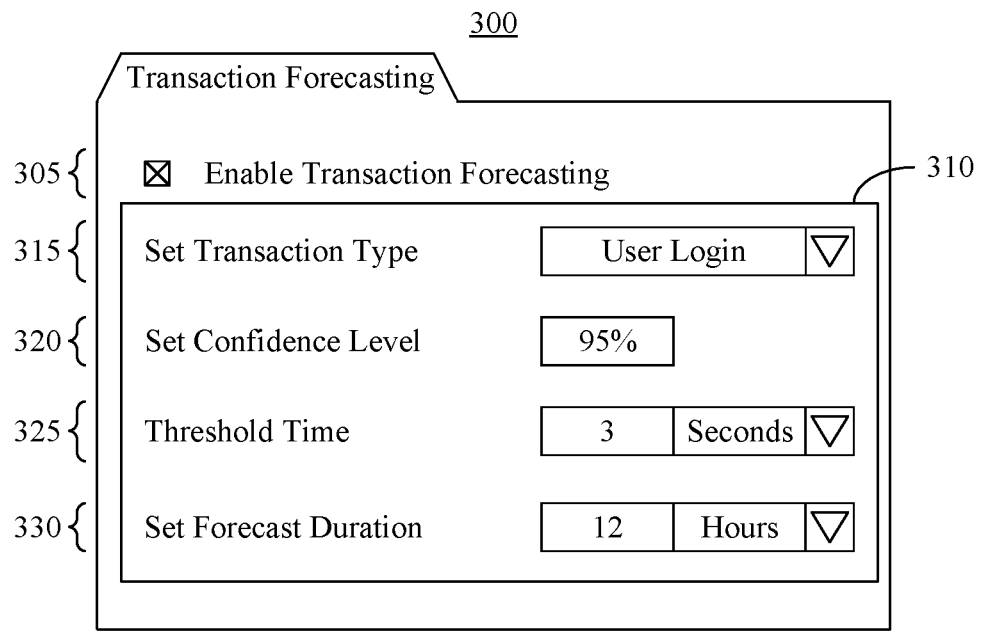
FIG. 3 is an example of a view of a user interface generated by the performance test system of FIG. 1 in accordance with another embodiment disclosed within this specification.

FIG. 3 is an example of a view 300 of a user interface generated by performance test system 105 in accordance with another embodiment disclosed within this specification. View 300 can be presented to a user, e.g., a member of reliability test personnel, to receive user input specifying various system preferences that determine how the performance test system will operate during reliability testing. As shown, view 300 includes a plurality of different sections 305, 315, 320, 325, and 330 through which user input can be received.

Section 305 includes a check box that allows the user, via user input, to enable or disable transaction forecasting for reliability testing. When enabled, the performance test system generates forecasts of transaction times as described in further detail within this specification. When not enabled, the performance test system does not generate forecasts of transaction times.

Box 310 defines a collection of sections, i.e., sections 315, 320, 325, and 330. Sections 315-330 can be related in that the parameters specified for sections 320, 325, and 330 can be specific to the particular transaction type selected in section 315. Section 315, for example, includes a selection box within which a user, via user input, can specify a particular transaction type. Any of the various transaction types described with this specification, for example, can be selected. In one aspect, only those transaction types that are included within the particular test plan to be implemented during reliability testing can be selected.

Section 320 includes a field within which a user, via user input, can specify a particular confidence level for transaction forecasting. The confidence level specified indicates the degree of certainty in the forecasts that are generated during reliability testing for the selected transaction type. For example, a confidence level of 95% indicates that each forecast of a transaction time for a future moment in time is expected to be within 5% of the actual transaction time for the specified future moment in time were reliability testing to continue. In general, the higher the confidence level, the more complex the calculation to be performed in determining the forecasts. Accordingly, computing forecasts with a confidence level of 95%, in general, requires greater processor and/or memory resources of the performance test system and, thus, requires more time to compute than forecasts with a lesser confidence level.

Section 325 includes data input areas in which a user can specify a threshold time. The threshold time is the amount of time to which forecasts of transaction times calculated during reliability testing are compared in determining whether to implement remedial actions. In one aspect, the threshold time can be a maximum average response time. In this regard, the forecasts can be forecasts of average transaction times. As discussed, the threshold time specified in section 325 can be specific to the particular transaction type selected in section 315. Section 325 can include a data field in which a user can specify a value and a selection box through which a user can select a unit of time. In the example illustrated in FIG. 3, the user has specified a threshold time for "user login" type transactions during reliability testing of 3 seconds.

Section 330 includes data input areas in which a user can specify, or set, a forecast duration. The forecast duration specifies an amount of time in the future for which the performance test system is to calculate forecasts of transaction times for the type of transaction specified in section 315. As shown, section 330 can include a field in which a user can specify a numeric value and a selection box through which a user can select a unit of time. In the example pictured in FIG. 3, a forecast duration of 12 hours is specified. Thus, the performance test system will calculate forecasts of transaction times up to 12 hours into the future from a current moment in time during reliability testing for the particular transaction type selected in section 320. Each forecast is calculated using the defined confidence level.

In one aspect, the performance test system calculates multiple forecasts throughout the forecast duration. For example, given the 12 hour forecast duration, the performance test system can calculate a forecast of transaction time for time intervals of one second. Thus, in this example, the performance test system calculates a forecast for the transaction time for the current time plus one second, for the current time plus two seconds, etc., until a forecast of the current time plus 12 hours is reached.

It should be appreciated that the forecast duration can be specified in a variety of different formats. For example, forecast duration can be specified as a set amount of time extending into the future as illustrated and described with reference to FIG. 3. In another aspect, forecast duration can be specified as an absolute time within the reliability testing. For example, if the reliability test takes 48 hours to complete, one option for the forecast duration can be to provide forecasts of transaction times from the current point in time within the reliability test through to the end of the reliability test or only through to the $40^{th}$ hour of the reliability test. Accordingly, the time period for which forecasts of transaction times are provided continues to decrease as the reliability test continues. In any case, responsive to the performance test system determining that the forecast(s) of transaction times exceed the threshold time specified in section 325, the performance test system can implement one or more remedial actions during reliability testing.

FIG. 3 illustrates an example in which parameters are specified for a single transaction type. It should be appreciated that view 300 can include further instances of box 310, thereby allowing a user to specify multiple transaction types and corresponding parameters for each transaction type. Accordingly, during reliability testing, the performance test system can monitor each of the specified transaction types when transaction forecasting is enabled and perform transaction forecasting according to the specified parameters for each respective transaction type.

Figure 4:
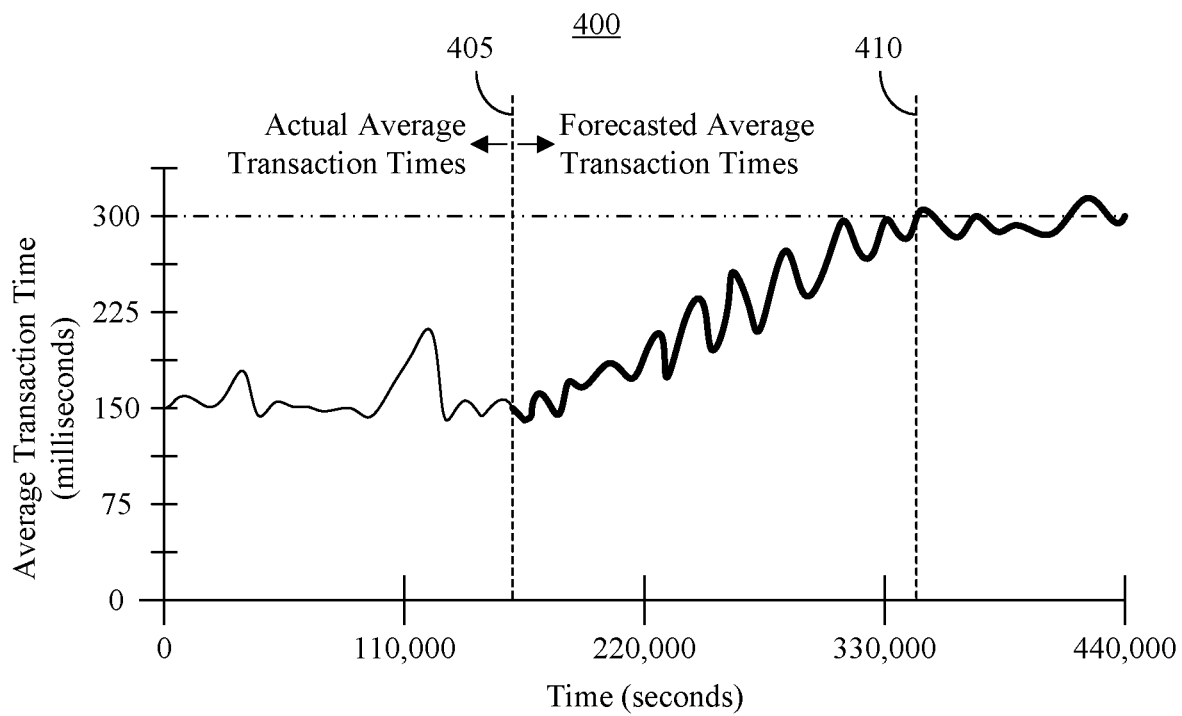
FIG. 4 is an example of a view of a user interface generated by the performance test of FIG. 1 in accordance with another embodiment disclosed within this specification.

FIG. 4 is an example of a view 400 of a user interface generated by performance test system 105 in accordance with another embodiment disclosed within this specification. View 400 can be generated by the performance test system during a reliability test, e.g., during a particular session of reliability testing. For example, view 400 can be presented through an administrative console of the performance test system. FIG. 4 illustrates a situation in which transaction forecasting has been enabled. For purposes of illustration, a confidence level of 95% can be presumed and a transaction type of user logins can be presumed for the transaction time data shown.

View 400 presents a graph of average transaction time vs. time of the reliability test. The vertical axis corresponds to average transaction time as measured in milliseconds. The horizontal axis corresponds to time as measured in seconds.

From view 400, the portion of the graph from time zero to line 405 on the horizontal axis represents a calculated average, e.g., a moving average, of actual transaction times measured during reliability testing. The portion of the data illustrated with a bold line from line 405 to time 440,000 seconds on the horizontal axis represents forecasts of average transaction times.

In this example, line 405 corresponds to approximately 41 hours into the reliability test (147,600 seconds). Forecasting has been enabled through the end of the reliability test as defined by the workload. In this example, the end of the reliability test is 122 hours (439,200 seconds). The threshold time for implementing remedial action is 3 seconds (300 milliseconds) as illustrated by the horizontal dashed line.

At the time indicated by line 410, the forecasts of average transaction time exceed the threshold of 3 seconds that has been set. Accordingly, the performance test system can initiate a remedial action responsive to determining that one or more of the forecasts of average transaction time exceed the threshold. As noted, the particular remedial action taken can depend upon the criticality of the transaction type selected, e.g., in this case the criticality of user logins. It should be appreciated that line 410 represents a forecast or estimate of when the average transaction time, within the reliability test, exceeds the threshold. The actual computation time of the forecasts to the right of line 405 take place at, or substantially at, the time of line 405. Accordingly, any remedial actions that are implemented are taken well before the time represented by line 410.

Figure 5:
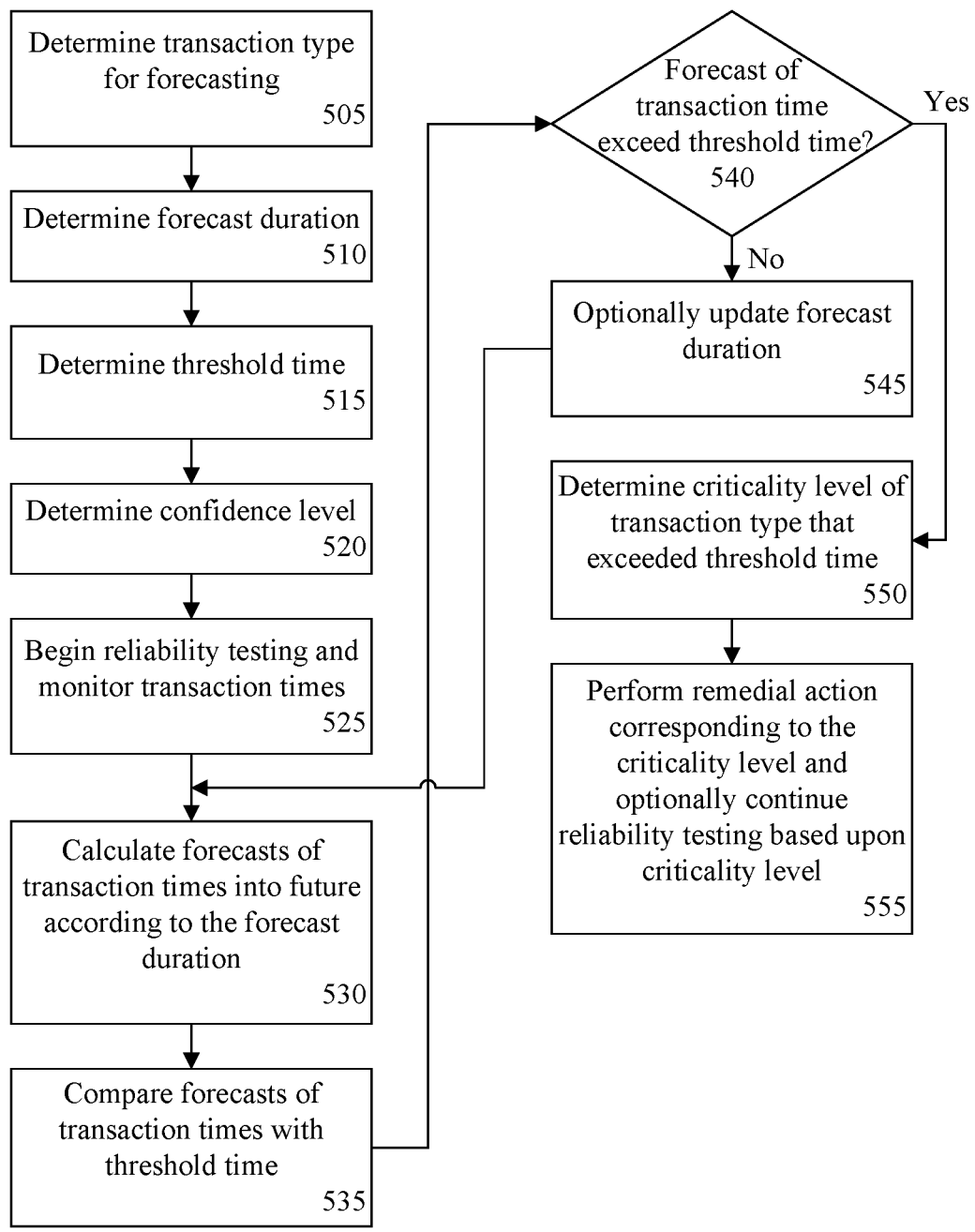
FIG. 5 is a flow chart illustrating a method of performing reliability testing in accordance with another embodiment disclosed within this specification.

FIG. 5 is a flow chart illustrating a method 500 of performing reliability testing in accordance with another embodiment disclosed within this specification. Method 500 can be performed by a performance test system, e.g., performance test system 105 of FIG. 1, as discussed within this specification. Method 500 can begin in a state where a user that is to conduct a reliability test of a system under test using the performance test system has enabled transaction forecasting.

FIG. 5 illustrates a case in which a single transaction type is enabled for forecasting. The embodiments disclosed within this specification, however, are not limited in this regard. Two or more transaction types can be enabled for forecasting concurrently within a same reliability test if desired. In that case, a forecasting duration, a confidence level, and a threshold time can be specified that is specific to each different transaction type that is enabled. Thus, various operations represented in method 500 can be implemented so that the various transaction types that are enabled for forecasting are monitored concurrently and processed concurrently as described generally with reference to FIG. 5.

Accordingly, in step 505, the performance test system can determine a transaction type that is enabled (e.g., the "selected" transaction type) for forecasting during the reliability test. In step 510, the performance test system can determine the forecasting duration for the selected transaction type. In step 515, the performance test system can determine the threshold time that has been set for the selected transaction type. In step 520, the performance test system can determine the confidence level to be used in calculating the forecasts for the selected transaction type. As discussed, each of the parameters identified or determined in steps 510-520 can be specific to the selected transaction type.

Continuing, in step 525, the performance test system can begin reliability testing. As such, the performance test system can begin monitoring transaction times for the selected transaction type. For example, each time a transaction of the selected transaction type is initiated with the system under test, the performance test system can store the time that the transaction is initiated. The performance test system also can store the time that each transaction of the selected transaction type ends or completes, e.g., the time of a response. In this manner, the performance test system can determine the transaction time for each transaction of the selected transaction type. The performance test system further can compute an average of transaction times for the selected transaction type. The performance test system, for example, can compute a running average of the transaction time for the selected transaction type.

In step 530, the performance test system can calculate forecasts of transaction times into the future according to the forecast duration and the confidence level. The performance test system, for example, can calculate a forecast of the average transaction time for the selected transaction type at various time intervals throughout the specified forecasting duration based upon the transaction time data that has been collected up to the time the forecasts are calculated. The performance test system calculates the forecasts of transaction times from the current moment in time to the end of the specified forecasting duration given the currently available transaction time data available for the selected transaction type.

The forecasts can be output using any of a variety of different visualization techniques. In one aspect, the forecasts can be output in graph form. The forecasts can be output in combination with, e.g., concurrently with, actual average transaction times as illustrated in FIG. 4. The graph, or display, can be updated each iteration of step 530 as new forecasts are calculated.

In one aspect, each forecast can be calculated using an Autoregressive Integrated Moving Average (ARIMA) model. In another embodiment, for example, when the reliability test is started, measured transaction time data can be initially differenced to obtain stationary mean and variance, which can be used to obtain the Order of the differencing. Auto and partial correlation results can be calculated and used to determine or select a particular type of ARIMA model from a plurality of ARIMA models available for use in calculating forecasts.

The use of ARIMA models is for purposes of illustration only. It should be appreciated that any of a variety of different predictive techniques available for time series modeling can be used. Other exemplary techniques can include, but are not limited to, Autoregressive Fractionally Integrated Moving Average (ARFIMA), Autoregressive Conditional Heteroskedasticity (ARCH), Generalized Autoregressive Conditional Heteroskedasticity (GARCH) models, etc. As noted, any of a variety of different models or modeling techniques can be used including various derivatives of the varieties specifically noted herein as appreciated by one skilled in the art. As such, the embodiments disclosed within this specification are not intended to be limited by the various exemplary techniques provided.

In step 535, the performance test system can compare the forecasts of the transaction times with the threshold time. In step 540, the performance test system can determine whether any of the forecasts of the transaction times exceed the threshold time. Responsive to determining that one or more of the forecasts of the transaction times calculated in step 530 exceed the threshold time, method 500 can proceed to step 550. Responsive to determining that none of the forecasts of the transaction time calculated in step 530 exceed the threshold time, method 500 can continue to step 545.

In step 545, the user, e.g., a member of reliability test personnel, can be provided with the option of updating, e.g., changing, the forecast duration. The forecast duration can be shortened, lengthened, or left the same. After step 545, method 500 can proceed to step 530, where the reliability test can continue. In step 530, the performance test system can again calculate forecasts of transaction times from the current moment in time, given the transaction time data collected thus far, into the future as specified by the forecasting duration. In this regard, the forecasts of transaction times are updated, e.g., are re-calculated, based upon the transaction time data available for each iteration of method 500 at the time step 530 is executed.

Continuing with step 550, the performance test system can determine the criticality of the selected transaction type. In the case where multiple, different transaction types have transaction forecasting enabled, the performance test system can determine the criticality of the selected transaction type.

In general, each transaction type can be assigned to one of a plurality of different criticality levels. Examples of criticality levels can include low, medium, high, fatal, or the like. An example of a low criticality level transaction type can include a search transaction in which the transaction is initiated with a search request and ends with the display of search results in response to the request. An example of a medium criticality level transaction type can include a credit card processing transaction or the like. An example of a high criticality level transaction type can include a user login transaction. A fatal criticality level transaction type can be one that, if not executing properly, can cause a fatal error, e.g., a crash, of the system under test.

In step 555, the performance test system can perform a remedial action in response to a forecast of transaction time exceeding the threshold. The particular remedial action that is implemented can depend upon the criticality level assigned to the transaction type that exceeded the threshold time.

For example, in the case of a low criticality level, the performance test system can send a notification to a user that is a member of the reliability test personnel. For instance, the performance test system can present a message upon a display, send an electronic mail, send a text message, initiate an automated phone call, or the like. After taking remedial action for a low criticality level transaction type, the performance test system can continue the reliability test, e.g., continue to step 530.

In the case of a medium criticality level, the performance test system can reduce the number of transactions of the selected type that are initiated during the reliability test. In another aspect, if a particular component of the system under test is utilized by the selected transaction type that exceeded the threshold time and one or more other transaction types, the performance test system can reduce the number of transactions initiated during the reliability test for all transaction types that utilize the component. After taking remedial action for a medium criticality level transaction type, the performance test system can continue the reliability test, e.g., continue to step 530, albeit with the reduced workload described.

In the case of high criticality level, the performance test system can discontinue initiation of transactions of the selected transaction type completely during the reliability test. In another aspect, if a particular component of the system under test is utilized by the selected transaction type that exceeded the threshold time and one or more other transaction types, the performance test system can discontinue initiation of transactions of all such transaction types during the reliability test. After taking remedial action for a high criticality level transaction type, the performance test system can continue the reliability test, e.g., continue to step 530, albeit without initiating any of the particular transaction types that were discontinued.

In the case of fatal criticality level, the performance test system can discontinue the reliability test in its entirety.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method for performing reliability testing on a software-based system, comprising:
receiving, from a user, an identification of a transaction type;
beginning, after receiving the identification, a reliability test lasting for a period of time indicating a forecast duration on the software-based system;
determining, during the reliability test, actual transaction times for a plurality of past transactions having the transaction type;
calculating, concurrently with the determining and for each of a plurality of different time instances after a current time and within the period of time, future transaction times for a plurality of future transactions having the transaction type;
comparing each of the calculated future transaction times to a threshold time; and
implementing, responsive to a calculated future transaction time exceeding threshold time, a remedial action.

2. The method of claim 1, wherein
the threshold time is received from the user prior to the beginning of the reliability test.

3. The method of claim 1, wherein
the user provides a confidence level, and
the calculating the future transaction times is performed using the confidence level.

4. The method of claim 1, wherein
the threshold time is specific to the transaction type.

5. The method of claim 1, wherein
an identification of a second transaction type is received from the user,
a second threshold time associated with the second transaction type is received from the user, and
the reliability test is performed using transactions having the transaction type and using transactions having the second transaction type.

6. The method of claim 5, wherein
each transaction type is associated with one of a plurality of different criticality levels, and the remedial action is implemented according to the criticality level of the transaction type for which the calculated future transaction time exceeds the threshold time.

7. The method of claim 5, wherein
the user provides a confidence level for the transaction type and a second confidence level for the second transaction type; and
the calculating the future transaction times for the plurality of future transactions having the transaction type is performed using the confidence level.

8. The method of claim 1, wherein
the remedial action includes changing an amount of the plurality of future transactions of the transaction type that are issued during the reliability test.

9. A computer hardware system configured to perform reliability testing on a software-based system, comprising:
a hardware processor configured to initiate the following executable operations:
receiving, from a user, an identification of a transaction type;
beginning, after receiving the identification, a reliability test lasting for a period of time indicating a forecast duration on the software-based system;
determining, during the reliability test, actual transaction times for a plurality of past transactions having the transaction type;
calculating, concurrently with the determining and for each of a plurality of different time instances after a current time and within the period of time, future transaction times for a plurality of future transactions having the transaction type;
comparing each of the calculated future transaction times to a threshold time; and
implementing, responsive to a calculated future transaction time exceeding threshold time, a remedial action.

10. The system of claim 9, wherein
the threshold time is received from the user prior to the beginning of the reliability test.

11. The system of claim 9, wherein
the user provides a confidence level, and
the calculating the future transaction times is performed using the confidence level.

12. The system of claim 9, wherein
the threshold time is specific to the transaction type.

13. The system of claim 9, wherein
an identification of a second transaction type is received from the user,
a second threshold time associated with the second transaction type is received from the user, and
the reliability test is performed using transactions having the transaction type and using transactions having the second transaction type.

14. The system of claim 13, wherein
each transaction type is associated with one of a plurality of different criticality levels, and
the remedial action is implemented according to the criticality level of the transaction type for which the calculated future transaction time exceeds the threshold time.

15. The system of claim 13, wherein
the user provides a confidence level for the transaction type and a second confidence level for the second transaction type; and
the calculating the future transaction times for the plurality of future transactions having the transaction type is performed using the confidence level.

16. The system of claim 9, wherein
the remedial action includes changing an amount of the plurality of future transactions of the transaction type that are issued during the reliability test.

17. A computer program product, comprising:
a hardware storage device having stored thereon program code for performing reliability testing on a software-based system,
the program code, which when executed by a computer hardware system, causes the computer hardware system to perform:
receiving, from a user, an identification of a transaction type;
beginning, after receiving the identification, a reliability test lasting for a period of time indicating a forecast duration on the software-based system;
determining, during the reliability test, actual transaction times for a plurality of past transactions having the transaction type;
calculating, concurrently with the determining and for each of a plurality of different time instances after a current time and within the period of time, future transaction times for a plurality of future transactions having the transaction type;
comparing each of the calculated future transaction times to a threshold time; and
implementing, responsive to a calculated future transaction time exceeding threshold time, a remedial action.

18. The computer program product of claim 17, wherein
the threshold time is received from the user prior to the beginning of the reliability test.

19. The computer program product of claim 17, wherein
the user provides a confidence level, and
the calculating the future transaction times is performed using the confidence level.

20. The computer program product of claim 17, wherein
the threshold time is specific to the transaction type.

* * * * *